(No Model.)
L. HAMERLY, Dec'd.
N. M. HAMERLY, Administratrix.
HOISTING MACHINE.
No. 520,426. Patented May 29, 1894.
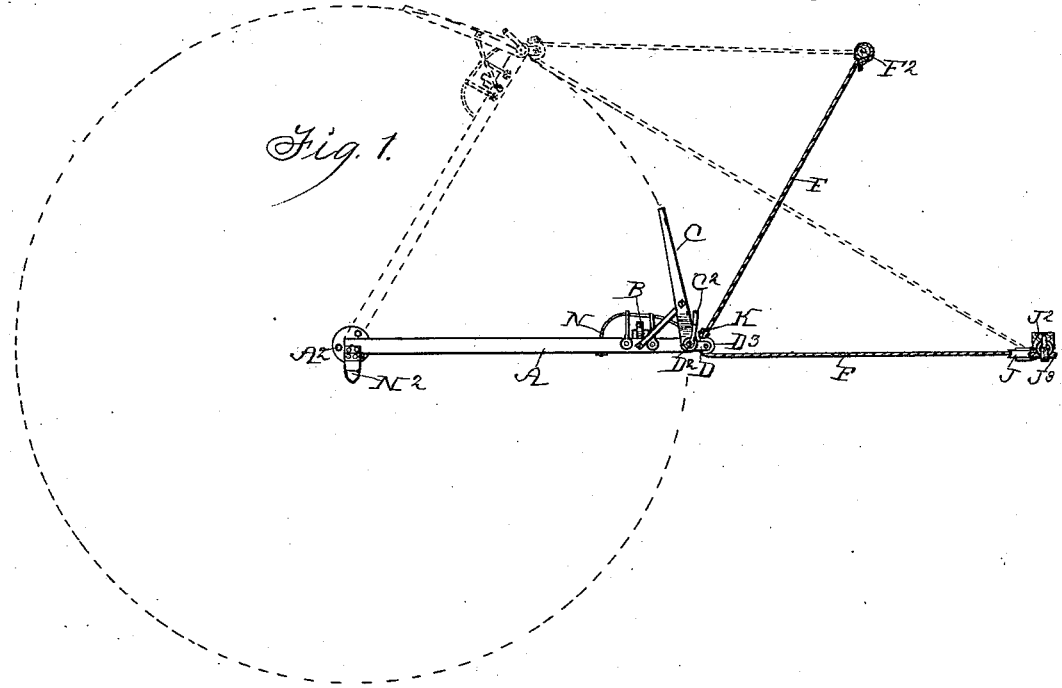
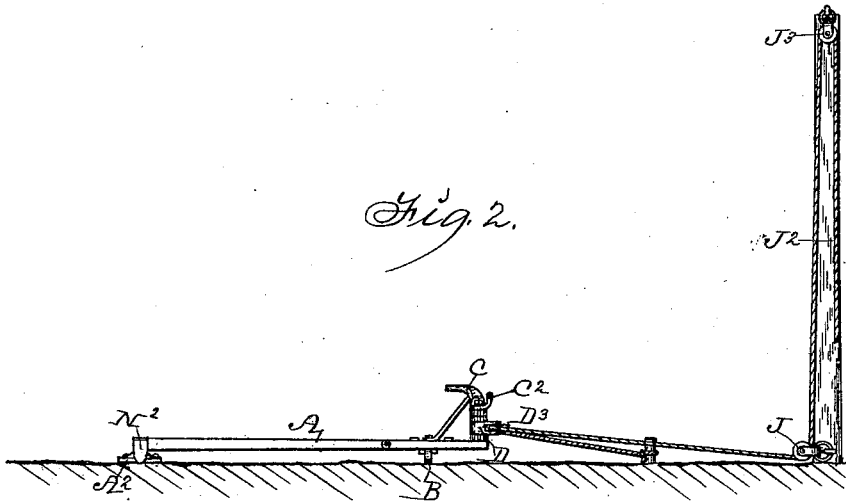
Witnesses:
W. A. Ballard.
R. H. Orwig.
Inventor: Leonard Hamerly.
by Thomas G. Orwig and
J. Ralph Orwig his Attorneys

UNITED STATES PATENT OFFICE.

LEONARD HAMERLY, OF JAMAICA, IOWA; NANCY M. HAMERLY ADMINISTRATRIX OF SAID LEONARD HAMERLY, DECEASED.

HOISTING-MACHINE.

SPECIFICATION forming part of Letters Patent No. 520,426, dated May 29, 1894.

Application filed October 17, 1893. Serial No. 488,443. (No model.)

*To all whom it may concern:*

Be it known that I, LEONARD HAMERLY, a citizen of the United States of America, residing at Jamaica, in the county of Guthrie and State of Iowa, have invented a new Hoisting-Machine, of which the following is a specification.

The object of my invention is to produce a simple, cheap and durable machine, adapted to be operated by draft animals to elevate hay or the like, whereby a draft animal may advance a comparatively great distance at the start of the movement of elevation before moving the object to be elevated, and then by a gradual increase, the power be increased as the distance of the movement of the object to be elevated is increased and then after the object to be elevated has been raised a certain predetermined distance, the pull by the draft animal upon the object will be approximately in a straight line during the greater portion of the movement of the object to be elevated, so that a minimum of applied power at the start, will give a maximum pull upon the object to be elevated, and the length of the movement of the object to be elevated, be gradually increased, in proportion to the distance traversed by the draft animal.

A further object is to provide a hoisting machine in which the ropes cannot become tangled and in which the draft animal may advance at all times in a straight line without having to be turned or backed each time that an object is elevated.

To this end my invention consists in the construction, arrangement and combination of a lever pivoted to a stationary support and having its outer end adapted for hitching a draft animal thereto and a rope having its one end fixed to a stationary support, its central portion passed through a pulley on the outer end of the aforesaid lever and running from thence over an elevated support where the weight is applied as hereinafter fully set forth, pointed out in my claims and illustrated in the accompanying drawings, in which—

Figure 1 is a top or plan view of the complete machine. Fig. 2 is a side elevation of the same.

Referring to the accompanying drawings, the reference letter A is used to designate a lever or frame which is pivotally mounted on its one end on a stationary support $A^2$ so that its outer end may swing in a complete circle.

B designates a wheel mounted in bearings near said outer end to support the weight of the lever.

C designates a tongue or guide fixed to said outer end to guide a draft animal attached to the lever A and $C^2$ is a device to which a singletree may be connected so that a draft animal may be hitched to the outer end of the lever.

D designates a link pivotally mounted on a rod $D^2$, that extends vertically through the outer end of the lever A to provide means for connecting the aforesaid tongue therewith, and this link is adapted to be capable of a movement in a complete circle upon its shaft $D^2$. The pulley $D^3$ is mounted in the outer end of said link.

The flexible rope or cable F has its one end fixed to a stationary post $F^2$ that is preferably located in a position approximating seventy-five degrees from a line between the pivotal point of the lever A and the upright point at which the weight is stationed. This angle, however, may be varied as will be hereinafter fully set forth. The rope or cable is then passed around the pulley D, under the pulley J that is fixed to some stationary support such as a post, designated by the letter $J^2$, and $J^3$ is a pulley mounted in the top of said post over which the rope is passed, so that a weight may be applied to its lower end and when the rope is pulled the weight will be elevated.

K designates a stop formed on or fixed to the rope F at a point which will be in engagement with the pulley $D^3$ when the apparatus is in the position shown in Fig. 1. As before stated, the position of the post $F^2$ relative to the post $J^2$ may vary in proportion to the distance which it is desired that the draft animal shall traverse before the speed of elevation of the weight shall become doubled by the rope passing through the pulley $D^3$ as it will be obvious that the nearer the post $F^2$ is placed relative to the post $J^2$ the shorter will be the distance to be traversed by the draft animal.

In practical operation, we will assume that the apparatus is in such a position that the lever A will be in direct alignment with the point where the weight is applied, as shown in solid lines in Fig. 1. Then it will be obvious that when power is applied to the outer end of said lever to move in the direction indicated that the stop K will prevent the passage of the rope F through the pulley $D^3$ so that the operation of the apparatus will be substantially the same as though the lever A and the part of the rope F between the pulley $D^3$ and the pulley J were one continuous rope and the pull would be applied to the central portion thereof at right angles to the rope, in which position it will be seen that a draft animal would advance a comparatively great distance while the weight were being elevated a comparatively small distance. This is greatly advantageous when elevating a load of hay for the reason that greater power is required to disengage a portion of the hay from the remainder of the load than is required to elevate the load after it is disengaged. Then as the draft animal advances until he reaches the position indicated by the dotted lines in said figure, the pull will greatly increase, that is as the load is being elevated or started from the pile of hay, the draft animal will be required to travel a gradually shortening distance in relation to the distance traversed by the weight. When, however, the device reaches the position indicated by said dotted lines the rope will become taut between the end fixed to the post $F^2$ and the pulley $D^3$ so that a further pull upon the apparatus will tend to elevate the weight just double the distance traversed by the draft animal. Said power is applied in such a manner as to elevate the weight during more than half of the circle described by the draft animal when operating the device.

The reference letter N is used to designate a guard which is fixed to the outer end of the lever A and passed around the wheel B in such a manner as to prevent the rope from passing over the wheel so that the draft animal may travel in a complete circle and the device be in position ready for starting when the lever A again reaches the position shown in solid lines in the said figure; and $N^2$ is an inclined guide hinged to the inner end of the lever A to pass the rope from the ground over the lever A to prevent the said rope from becoming tangled or caught in the lever A.

Having thus described my invention, what I claim as new therein, and desire to secure by Letters Patent of the United States therefor, is—

1. A hoisting apparatus, comprising two stationary supports, a lever pivotally mounted on one of said supports and capable of describing a complete circle, and a rope fixed to the second and slidingly connected with the outer end of said lever to operate in the manner set forth.

2. A hoisting apparatus, comprising three stationary supports, a lever pivotally mounted on one of said supports and capable of describing a complete circle, and a rope fixed to the second support slidingly connected with the outer end of said lever and passed over the third support to operate in the manner set forth.

3. A hoisting apparatus, comprising three stationary supports, a lever pivoted to one of said supports and capable of describing a complete circle, means for attaching a draft animal to the outer end of said lever, a pulley in said end, a rope fixed to one of said supports, passed around said pulley, and a pulley in the third stationary support having said rope passed thereover, substantially as, and for the purposes, stated.

4. A hoisting apparatus, comprising three stationary supports, a lever pivotally connected with one of said supports and capable of describing a complete circle, a wheel under the outer end of said lever, a guard covering said wheel, a guide fixed to the inner end of said lever, a tongue attached to the outer end of the lever and a pulley mounted in said end, a rope fixed to the second support, passed around said pulley on the lever, and a pulley in top of the third support having said rope passed thereover, for the purposes stated.

LEONARD HAMERLY.

Witnesses:
C. M. CROSS,
A. G. EDMOND.